United States Patent
Takeyama et al.

(10) Patent No.: US 12,107,533 B2
(45) Date of Patent: Oct. 1, 2024

(54) SOLAR POWER GENERATION SYSTEM

(71) Applicant: OMRON Corporation, Kyoto (JP)

(72) Inventors: Takahiro Takeyama, Kyoto (JP); Ryo Ogura, Kyoto (JP); Jeongho Baik, Kyoto (JP); Jun Nakaichi, Kyoto (JP); Tsuyoshi Uchida, Hoffman Estates, IL (US); Tomoko Endo, Hoffman Estates, IL (US); Erica Martin, Hoffman Estates, IL (US)

(73) Assignee: OMRON CORPORATION, Kyoto (JP)

( * ) Notice: Subject to any disclaimer, the term of this patent is extended or adjusted under 35 U.S.C. 154(b) by 382 days.

(21) Appl. No.: 17/568,719

(22) Filed: Jan. 5, 2022

(65) Prior Publication Data

US 2022/0247349 A1   Aug. 4, 2022

(30) Foreign Application Priority Data

Jan. 29, 2021 (JP) .................. 2021-013543

(51) Int. Cl.
*H02S 40/32* (2014.01)
*H02S 40/34* (2014.01)

(52) U.S. Cl.
CPC .............. *H02S 40/32* (2014.12); *H02S 40/34* (2014.12); *H02J 2300/24* (2020.01)

(58) Field of Classification Search
CPC ....... H02J 2300/24; H02S 40/34; H02S 40/32
(Continued)

(56) References Cited

U.S. PATENT DOCUMENTS

2016/0372929 A1   12/2016   Ishikawa
2018/0248359 A1   8/2018   Zou et al.
(Continued)

FOREIGN PATENT DOCUMENTS

JP   2012-511299 A   5/2012
JP   3189106 U   2/2014
(Continued)

OTHER PUBLICATIONS

Mathe, Laszlo et al., "Firefighter Safety for PV Systems: A Solution for the Protection of Emergency Responders from Hazardous dc Voltage", IEEE Industry Applications Magazine, Feb. 26, 2015, vol. 21, No. 3, pp. 75-84, DOI: 10.1109/MIAS.2014.2345834.
(Continued)

*Primary Examiner* — Vivek K Shirsat
(74) *Attorney, Agent, or Firm* — SHINJYU GLOBAL IP

(57) ABSTRACT

A solar power generation system includes a string, an inverter, and a first shut-off device. The string includes a plurality of solar cell modules connected in series. The inverter converts DC power output from the plurality of solar cell modules to AC power. The first shut-off device is connected to electrical paths connecting the plurality of solar cell modules to each other. The string includes a plurality of solar cell module groups each including the plurality of the solar cell modules. The plurality of solar cell module groups include at least a first group and a second group connected to the first group. The first shut-off device shuts off a first electrical path connecting the first group and the second group and a second electrical path connecting the plurality of solar cell modules belonging to the first group to each other in response to a control signal from the inverter.

14 Claims, 6 Drawing Sheets

(58) Field of Classification Search
USPC .......................................................... 126/701
See application file for complete search history.

(56) References Cited

U.S. PATENT DOCUMENTS

2018/0316308 A1     11/2018   Hopf
2022/0109399 A1      4/2022   Ogura et al.

FOREIGN PATENT DOCUMENTS

JP      2016135016 A  *   7/2016
WO      2020/174657 A1    9/2020

OTHER PUBLICATIONS

The Office Action of the corresponding Japanese application No. 2021-013543 issued on Nov. 28, 2023.

* cited by examiner

| OPERATION MODE | WEATHER/ SUNSHINE | POWER GENERATION | CONTROL SIGNAL | RELAY OPERATION MODE |
|---|---|---|---|---|
| START | ☀ | YES | ON | ON |
| ACTIVE | ☀ | YES | ON | ON |
| SAFETY / NORMAL SHUT-OFF | ☽☁ | NO | OFF | OFF |
| | ⛅ | UNSTABLE | ON | ON/OFF |
| EMERGENCY SAFETY SHUT-OFF | ☀ | YES | OFF | OFF |

FIG. 4

SOLAR POWER GENERATION SYSTEM

CROSS-REFERENCE TO RELATED APPLICATION

This application claims priority to Japanese Patent Application No. 2021-13543, filed Jan. 29, 2021. The contents of that application are incorporated by reference herein in their entirety.

FIELD

The present invention relates to a solar power generation system.

BACKGROUND

In the United States, for the purpose of protecting firefighters from electrical shock in an emergency such as a fire, the introduction of a so-called rapid shutdown function that immediately stops power generation by a solar power generation system during an emergency has been mandated by the National Electrical Code (NEC) for solar power generation systems. For example, Published Japanese Translation No. 2012-511299 of the PCT International Publication discloses a solar power generation system that stops the output of electrical power from a solar cell module to an inverter according to the operating state of the inverter.

SUMMARY

In a solar power generation system, in order to further improve the safety of firefighters in the event of a fire or the like, it is preferable to for example install in each solar cell module a shut-off device provided with the rapid shutdown function. However, if a shut-off device is installed for each solar cell module, the installation cost of shut-off devices becomes high.

An object of the present invention is to provide a solar power generation system capable of achieving both a reduction in the installation cost of shut-off devices and an improvement in safety in a solar power generation system.

A solar power generation system according to one aspect of the present invention includes a string, an inverter, and a first shut-off device. The string includes a plurality of solar cell modules connected in series. The inverter is configured to convert the DC power output from the plurality of solar cell modules to AC power. The first shut-off device is connected to electrical paths connecting the plurality of solar cell modules to each other. The string includes a plurality of solar cell module groups each including the plurality of the solar cell modules.

The plurality of solar cell module groups includes at least a first group and a second group connected to the first group. The first shut-off device is configured to shut off an electrical path connecting the first group and the second group and one of electrical paths connecting the plurality of solar cell modules belonging to the first group to each other in response to a control signal from the inverter.

In this solar power generation system, the first shut-off device shuts off an electrical path connecting the first group and the second group of a plurality of solar cell module groups and one of electrical paths connecting the plurality of solar cell modules belonging to the first group to each other in response to a control signal from the inverter. In other words, the connection between the first group and the second group and the connection between the solar cell modules belonging to the first group can be shut off by one shut-off device. Thereby, the installation cost of the shut-off devices can be reduced as compared with the case where the shut-off devices are installed for each solar cell module. In addition, it is possible to provide a safer solar power generation system as compared with the case of severing the plurality of solar cell modules and the inverter in a string unit.

The first group may include at least a first solar cell module connected to the second group and a second solar cell module connected to the second group among the plurality of the solar cell modules. The second group may include a third solar cell module connected to the first solar cell module among the plurality of solar cell modules. The first shut-off device may include a first opening/closing unit configured to open/close a connection between the first solar cell module and the third solar cell module, and a second opening/closing unit configured to open/close a connection between the first solar cell module and the second solar cell module. In this case, the wiring connecting the first shut-off device and the plurality of solar cell modules becomes short and simple. In addition, the connection between the plurality of solar cell modules can be shut off with a simple configuration.

The first opening/closing unit of the first shut-off device may be connected to one of a terminal on an anode side or a terminal on a cathode side of the first solar cell module. The second opening/closing unit of the first shut-off device may be connected to another of the terminal on the anode side or the terminal on the cathode side of the first solar cell module. In this case, the wiring connecting the first shut-off device and the solar cell module becomes short and simple, and the connection between the plurality of solar cell modules can be shut off with a simple configuration.

The first shut-off device may be driven by an electrical power generated by the first solar cell module. In this case, for example, when the first shut-off device is installed in an existing solar power generation system, the additional wiring connecting the inverter and the first shut-off device can be omitted. In addition, the drive voltage range of the first shut-off device can be kept small, the manufacturing cost of the shut-off device can be reduced.

The first shut-off device may be externally attached to the first solar cell module. In this case, the first shut-off device can be easily installed in an existing solar power generation system.

The solar power generation system may further include a second shut-off device connected to electrical paths connecting the plurality of solar cell modules to each other. The plurality of solar cell module groups may further include a third group connected to the second group. The second shut-off device may be configured to shut off an electrical path connecting the second group and the third group and one of electrical paths connecting the plurality of solar cell modules belonging to the second group to each other in response to the control signal from the inverter. In this case, the installation cost of the shut-off device can be reduced in the case where the plurality of solar cell module groups is divided into three or more groups.

The second group may include a fourth solar cell module connected to the third group among the plurality of solar cell modules. The second shut-off device may include a third opening/closing unit connected to one of a terminal on an anode side or a terminal on a cathode side of the fourth solar cell module, and a fourth opening/closing unit connected to another of the terminal on the anode side or the terminal on the cathode side of the fourth solar cell module. In this case, the wiring connecting the second shut-off device and the plurality of solar cell modules becomes short and simple.

The inverter may be further configured to output the control signal to the first shut-off device and the second shut-off device by power line communication. In this case, when the first and second cutoff devices are installed in the existing photovoltaic power generation system, additional wiring for ensuring communication between the inverter and the first and second shut-off devices can be omitted. Thereby, the installation cost of the first and second shutoff devices can be reduced.

The first shut-off device and second shut-off device each may include a signal receiving unit configured to receive the control signal from the inverter, and a bypass circuit configured to cause the signal receiving unit to receive the control signal from the inverter in a state where electrical paths connected to the first shut-off device and electrical paths connected to the second shut-off device are shut off. In this case, electrical paths in the shut-off state by the first shut-off device and electrical paths in the shut-off state by the second shut-off device can be released from in the shut-off state in response to the control signal from the inverter.

BRIEF DESCRIPTION OF THE DRAWINGS

FIG. 4 is a diagram illustrating an example of an operation mode of the shut-off device.

DETAILED DESCRIPTION

Figure 1:
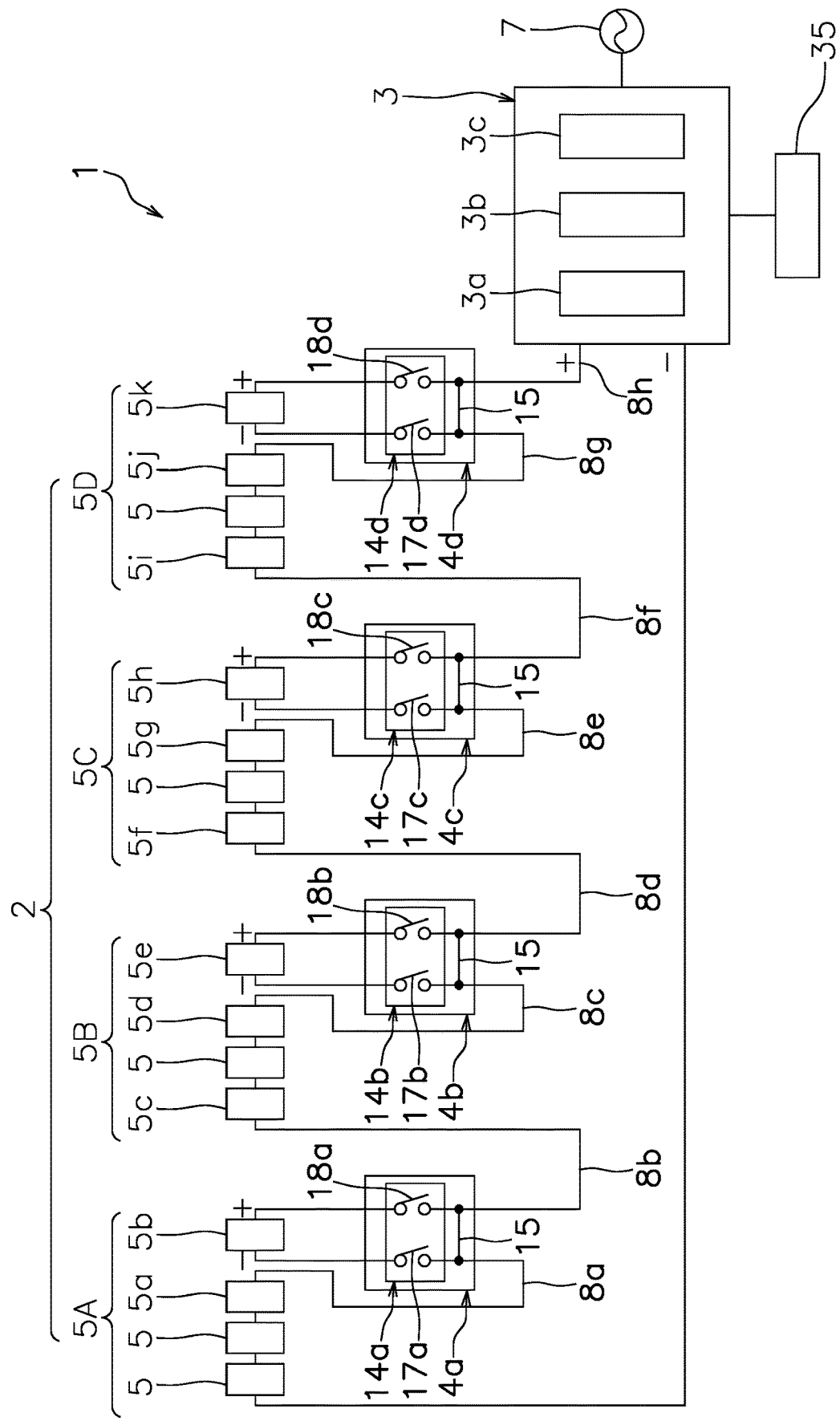
FIG. 1 is a block diagram schematically showing a configuration of a solar power generation system according to an aspect of the present invention.

FIG. 1 is a block diagram schematically showing a configuration of a solar power generation system 1 according to an aspect of the present invention. The solar power generation system 1 includes a string 2, an inverter 3, and a plurality of shut-off devices 4a to 4d.

The string 2 includes a plurality of solar cell modules 5 connected in series with each other. The string 2 in the present embodiment is composed of 16 solar cell modules 5 including the solar cell modules 5a to 5k. The string 2 includes a plurality of solar cell module groups each including the plurality of solar cell modules 5.

Specifically, the string 2 includes a plurality of solar cell module groups in which the plurality of solar cell modules 5 are divided into three or more groups. The string 2 in the present embodiment includes solar cell module groups 5A to 5D in which the plurality of solar cell modules 5 are divided into four groups.

In order to make the following explanation easier to understand, the solar cell module groups 5A to 5D will be described as groups 5A to 5D. The group 5A is an example of a first group, the group 5B is an example of a second group, and the group 5C is an example of a third group. The solar cell module 5b is an example of a first solar cell module. The solar cell module 5a is an example of a second solar cell module. The solar cell module 5c is an example of a third solar cell module. The solar cell module 5e is an example of the fourth solar cell module.

The group 5A is connected to the inverter 3 and the group 5B. The group 5A includes at least the solar cell module 5a and the solar cell module 5b among the plurality of solar cell modules 5. The solar cell module 5a is connected to the solar cell module 5b. The solar cell module 5b is connected to the solar cell module 5a and the group 5B. As shown in FIG. 1, the group 5A in the present embodiment is composed of four solar cell modules 5 including the solar cell modules 5a and 5b.

The group 5B is positioned between the group 5A and the group 5C and is connected to the group 5A and the group 5C. The group 5B includes at least the solar cell module 5c, the solar cell module 5d, and the solar cell module 5e among the plurality of solar cell modules 5. The solar cell module 5c is connected to the solar cell module 5b of the group 5A. The solar cell module 5d is connected to the solar cell module 5e. The solar cell module 5e is connected to the solar cell module 5d and the group 5C. The group 5B in the present embodiment is composed of four solar cell modules 5 including the solar cell modules 5c, 5d, 5e, and one solar cell module 5 disposed between the solar cell module 5c and the solar cell module 5d.

The group 5C is positioned between the group 5B and the group 5D and is connected to the group 5B and the group 5D. The group 5C includes at least the solar cell module 5f, the solar cell module 5g, and the solar cell module 5h among the plurality of solar cell modules 5. The solar cell module 5f is connected to the solar cell module 5e of the group 5B. The solar cell module 5g is connected to the solar cell module 5h. The solar cell module 5h is connected to the solar cell module 5g and the group 5C. The group 5C in the present embodiment is composed of four solar cell module 5 including the solar cell module 5f, 5g, 5h, and one solar cell module 5 disposed between the solar cell module 5f and the solar cell module 5g.

The group 5D is connected to the group 5C. The group 5D includes at least the solar cell module 5i, the solar cell module 5j, and the solar cell module 5k among the plurality of solar cell modules 5. The solar cell module 5i is connected to the solar cell module 5h of the group 5C. The solar cell module 5j is connected to the solar cell module 5k. The solar cell module 5k is connected to the solar cell module 5j and the inverter 3. The group 5D in the present embodiment is composed of four solar cell module 5 including the solar cell modules 5i, 5j, 5k, and one solar cell module 5 disposed between the solar cell module 5i and the solar cell module 5j.

Each of the solar cell module groups 5A to 5D in the present embodiment includes four solar cell modules 5 connected in series. The solar power generation system 1 may include a solar cell array in which a plurality of the strings 2 are connected in parallel.

Each of the solar cell module 5 receives sunlight to generate electrical power, and outputs the generated electrical power to the inverter 3. The open circuit voltage of the solar cell module 5 is, for example, 50V. The inverter 3 is connected to the string 2 via a power line 6. The inverter 3 converts the DC power output from the solar cell modules 5a into AC power. The inverter 3 is connected to a power system 7 and thereby supplies AC power to a commercial power system and a load device.

Specifically, the inverter 3 includes a DC/DC converter 3a, a DC/AC inverter 3b, and a control unit 3c. The DC/DC converter 3a converts the voltage of the electrical power output from the solar cell modules 5 into a predetermined voltage that is input to the DC/AC inverter 3b. The DC/AC inverter 3b converts the DC power output from the solar cell modules 5 into AC power via the DC/DC converter 3a. The control unit 3c includes a CPU, a memory, and the like, and controls the DC/DC converter 3a and the DC/AC inverter 3b. Further, the control unit 3c outputs a control signal to the shut-off devices 4a to 4d by power line communication.

The shut-off devices 4a to 4d are connected to an electrical path connecting the solar cell modules 5 to each other. The shut-off devices 4a to 4d shut off the voltage output from the solar cell module 5 in response to the control signal from the inverter 3.

The shut-off devices 4a to 4d are not provided with a bypass diode. Therefore, when the voltage output from the solar cell modules 5 is shut off by the shut-off devices 4a to 4d, the voltage input to the inverter 3 is shut off.

The shut-off device 4a is connected to an electrical path 8a and an electrical path 8b. The electrical path 8a connects the solar cell modules 5 belonging to the group 5A to each other. The electrical path 8a connects the solar cell module 5a and the solar cell module 5b. The electrical path 8b connects the group 5A and the group 5B. The electrical path 8b connects the solar cell module 5b and the solar cell module 5c. The shut-off device 4a shuts off the electrical paths 8a and 8b by shutting off the voltage output from the solar cell module 5b in response to the control signal from the inverter 3. As a result, the connection between the solar cell module 5a and the solar cell module 5b and the connection between the solar cell module 5b and the solar cell module 5c (connection between the group 5A and the group 5B) are shut off. The shut-off device 4a is driven by the electrical power generated by the solar cell module 5b. The shut-off device 4a is externally attached to the solar cell module 5b.

The shut-off device 4b is connected to an electrical path 8c and an electrical path 8d. The electrical path 8c connects the solar cell modules 5 belonging to the group 5B to each other. The electrical path 8c connects the solar cell module 5d and the solar cell module 5e. The electrical path 8d connects the group 5B and the group 5C. The electrical path 8d connects the solar cell module 5e and the solar cell module 5f. The shut-off device 4b shuts off the electrical paths 8c and 8d by shutting off the voltage output from the solar cell module 5e in response to the control signal from the inverter 3. As a result, the connection between the solar cell module 5d and the solar cell module 5e and the connection between the solar cell module 5e and the solar cell module 5f (connection between the group 5B and the group 5C) are shut off. The shut-off device 4b is driven by the electrical power generated by the solar cell module 5e. The shut-off device 4b is externally attached to the solar cell module 5e.

The shut-off device 4c is connected to an electrical path 8e and an electrical path 8f. The electrical path 8e connects the solar cell modules 5 belonging to the group 5C to each other. The electrical path 8e connects the solar cell module 5g and the solar cell module 5h. The electrical path 8f connects the group 5C and the group 5D. The electrical path 8f connects the solar cell module 5h and the solar cell module 5i. The shut-off device 4c shuts off the electrical paths 8e and 8f by shutting off the voltage output from the solar cell module 5h in response to the control signal from the inverter 3. As a result, the connection between the solar cell module 5g and the solar cell module 5h and the connection between the solar cell module 5h and the solar cell module 5i (connection between the group 5C and the group 5D) are shut off. The shut-off device 4c is driven by the electrical power generated by the solar cell module 5h. The shut-off device 4c is externally attached to the solar cell module 5h.

The shut-off device 4d is connected to an electrical path 8g and electrical path 8h. The electrical path 8g connects the solar cell modules 5 belonging to the group 5D to each other. The electrical path 8g connects the solar cell module 5j and the solar cell module 5k. The electrical path 8h connects the group 5D and the inverter 3. The electrical path 8h connects the solar cell module 5k and the inverter 3. The shut-off device 4d shuts off the electrical paths 8g and 8h by shutting off the voltage output from the solar cell module 5k in response to the control signal from the inverter 3. As a result, the connection between the solar cell module 5j and the solar cell module 5k and the connection between the solar cell module 5k and the inverter 3 are shut off. The shut-off device 4d is driven by the electrical power generated by the solar cell module 5k. The shut-off device 4d is externally attached to the solar cell module 5k.

Figure 2:
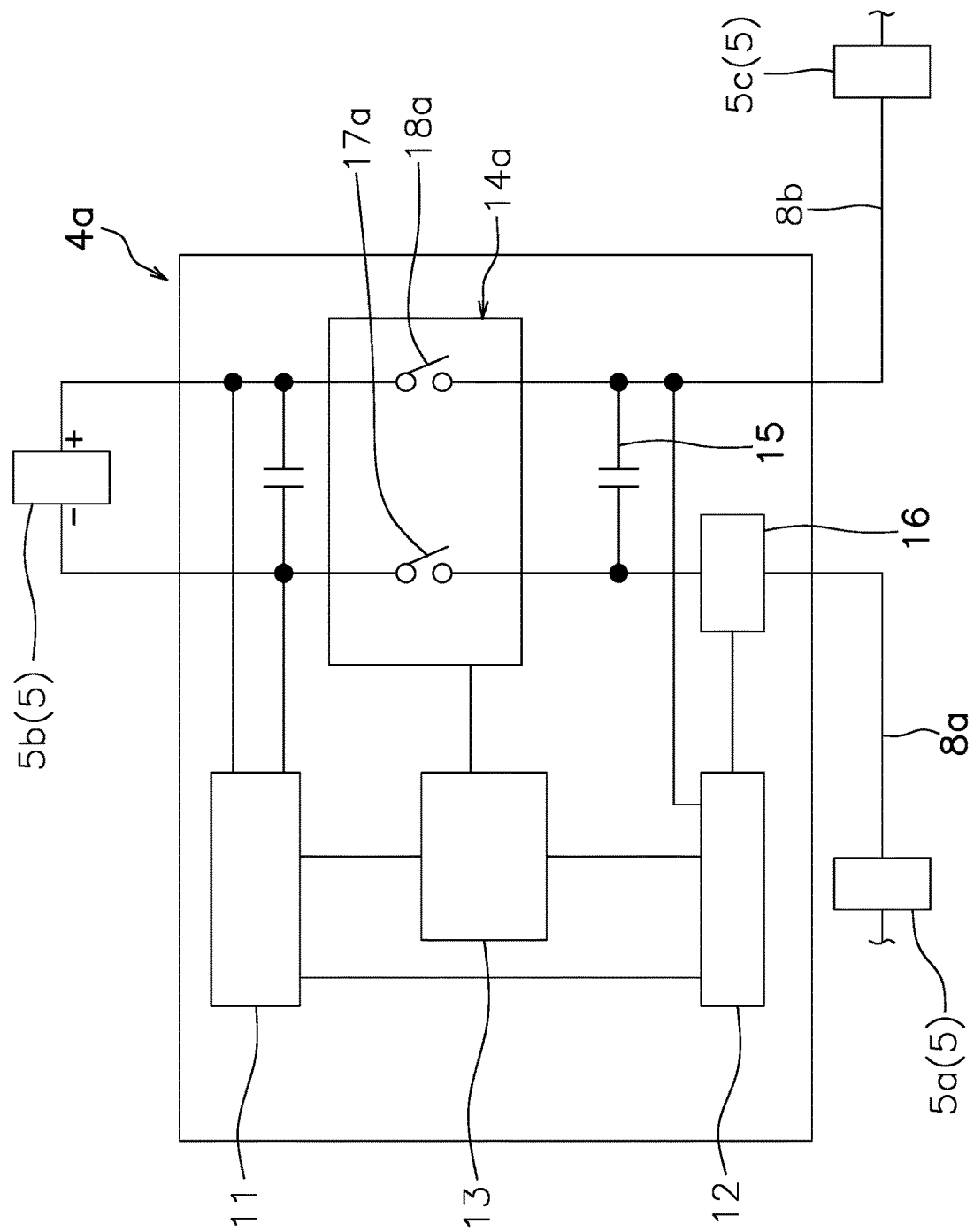
FIG. 2 is a block diagram schematically showing a configuration of a shut-off device.

FIG. 2 is a block diagram schematically showing a configuration of the shut-off device 4a. The shut-off device 4a includes a regulator 11, a signal receiving unit 12, a relay control unit 13, a relay 14a, and a bypass circuit 15.

The regulator 11 uses the electrical power generated by the solar cell module 5b as a power source to generate a drive power source for driving the shut-off device 4a and supplies the drive power source in a stable state to the shut-off device 4a. Here, the regulator 11 uses only the electrical power generated by a single solar cell module 5 (solar cell module 5b) to generate the drive power source for the shut-off device 4a. Since the drive voltage range of the regulator 11 can be kept small, the manufacturing cost of the shut-off device 4a can be reduced.

Figure 3:
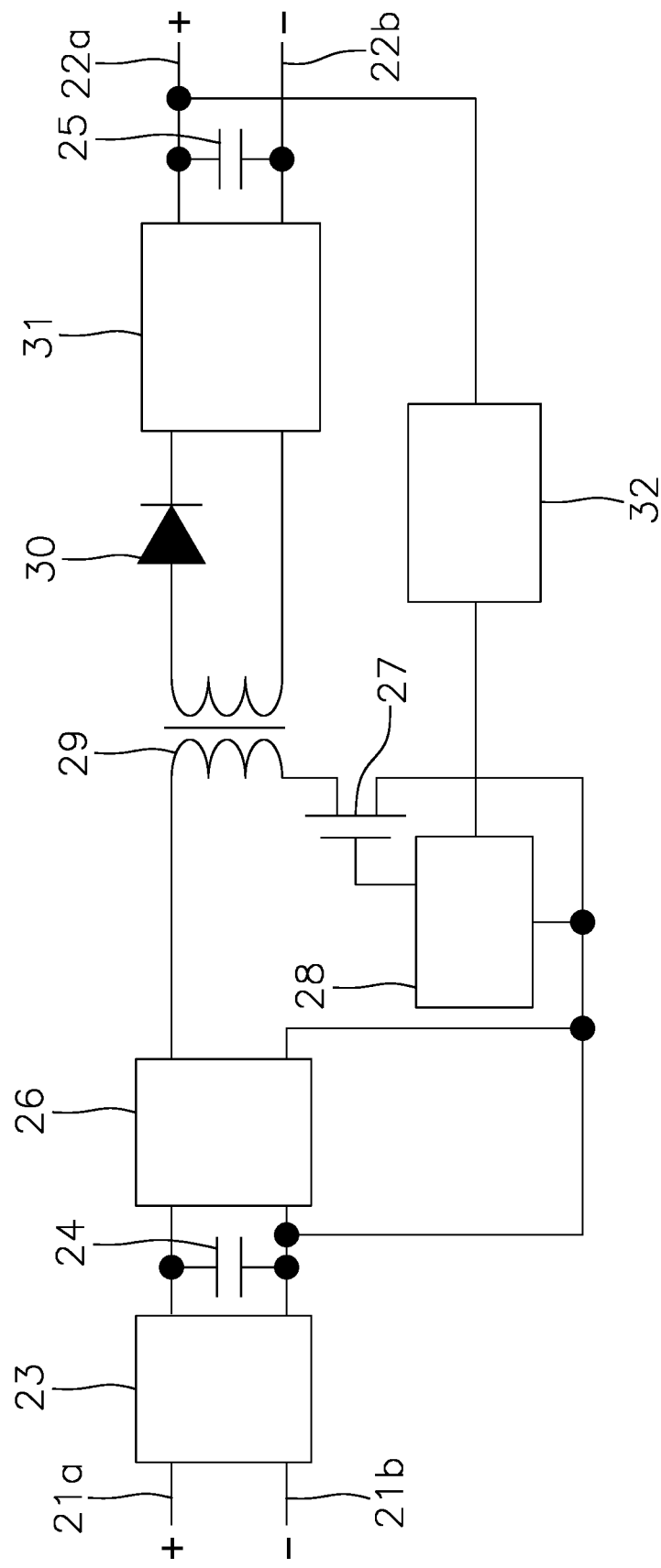
FIG. 3 is a circuit diagram schematically showing a configuration of the regulator.

FIG. 3 is a circuit diagram schematically showing a configuration of the regulator 11. The configuration of the regulator 11 is a well-known configuration, and includes input terminals 21a, 21b, output terminals 22a, 22b, a line filter 23, capacitors 24, 25, a booster circuit 26, a switching element 27, a control circuit 28, a transformer 29, a diode 30, a DC/DC converter 31, a feedback circuit 32 and the like.

The signal receiving unit 12 receives a control signal from the control unit 3c of the inverter 3 and outputs the received control signal to the relay control unit 13. Specifically, the signal receiving unit 12 receives the control signal from the control unit 3c of the inverter 3 via a signal detecting unit 16 that detects the control signal from the control unit 3c of the inverter 3.

On the basis of the signal output from the signal receiving unit 12, the relay control unit 13 controls the current value flowing through the coil of the relay 14a to control the opening and closing of the contacts of the relay 14a. The relay 14a is, for example, a mechanical relay, and can open and close a high-voltage direct current.

The relay 14a includes a first opening/closing unit 17a and a second opening/closing unit 18a. The first opening/closing unit 17a is disposed in the electrical path 8a. The first opening/closing unit 17a opens/closes the connection between the solar cell module 5a and the solar cell module 5b. The first opening/closing unit 17a is connected to a terminal on a cathode side of the solar cell module 5b. The second opening/closing unit 18a is disposed in the electrical path 8b. The second opening/closing unit 18a opens/closes the connection between the solar cell module 5b and the solar cell module 5c. The second opening/closing unit 18a is connected to a terminal on an anode side of the solar cell module 5b.

When the drive power source is not supplied to the shut-off device 4a, the first opening/closing unit 17a and the second opening/closing unit 18a are always in an open state. Therefore, when the shut-off device 4a is not driven, the connection between the solar cell module 5a and the solar cell module 5b and the connection between the solar cell module 5b and the solar cell module 5c are shut off.

The bypass circuit 15 is a circuit for allowing the signal receiving unit 12 to receive the control signal from the control unit 3c when the shut-off device 4a is in a shut-off state. When the electrical paths 8a and 8b are shut off by the shut-off device 4a, the signal receiving unit 12 can receive the control signal from the control unit 3c via the bypass circuit 15.

The shut-off devices 4b to 4d have the same configuration as the shut-off device 4a except that the connected electrical path is different from the shut-off device 4a. The shut-off device 4b includes a relay 14b including a first opening/closing unit 17b and a second opening/closing unit 18b. The first opening/closing unit 17b is disposed in the electrical path 8c. The first opening/closing unit 17b is connected to a terminal on a cathode side of the solar cell module 5e, and opens/closes the connection between the solar cell module 5d and the solar cell module 5e. The second opening/closing unit 18b is disposed in the electrical path 8d. The second opening/closing unit 18b is connected to a terminal on an anode side of the solar cell module 5b, and opens/closes the connection between the solar cell module 5e and the solar cell module 5f.

The shut-off device 4c includes a relay 14c including a first opening/closing unit 17c and a second opening/closing unit 18c. The first opening/closing unit 17c is disposed in the electrical path 8e. The first opening/closing unit 17c is connected to a terminal on a cathode side of the solar cell module 5h, and opens/closes the connection between the solar cell module 5g and the solar cell module 5h. The second opening/closing unit 18c is disposed in the electrical path 8f. The second opening/closing unit 18c is connected to a terminal on an anode side of the solar cell module 5h, and opens/closes the connection between the solar cell module 5h and the solar cell module 5i.

The shut-off device 4d includes a relay 14d including a first opening/closing unit 17d and a second opening/closing unit 18d. The first opening/closing unit 17d is disposed in the electrical path 8g. The first opening/closing unit 17d is connected to a terminal on a cathode side of the solar cell module 5k, and opens/closes the connection between the solar cell module 5j and the solar cell module 5k. The second opening/closing unit 18d is disposed in the electrical path 8h. The second opening/closing unit 18d is connected to a terminal on an anode side of the solar cell module 5k, and opens/closes the connection between the solar cell module 5k and the inverter 3. In this embodiment, the second opening/closing unit 18d of the shut-off device 4d may be omitted.

Next, an example of the operation modes of the shut-off devices 4a to 4d will be described with reference to FIG. 4. The operation modes of the shut-off devices 4a to 4d include three operation modes of a start mode, an active mode, and a safety mode. The safety mode includes a normal shut-off mode and an emergency safety shut-off mode. Therefore, the shut-off devices 4a to 4d operate in four operation modes: a start mode, an active mode, a normal shut-off mode, and an emergency safety shut-off mode.

Figure 5:
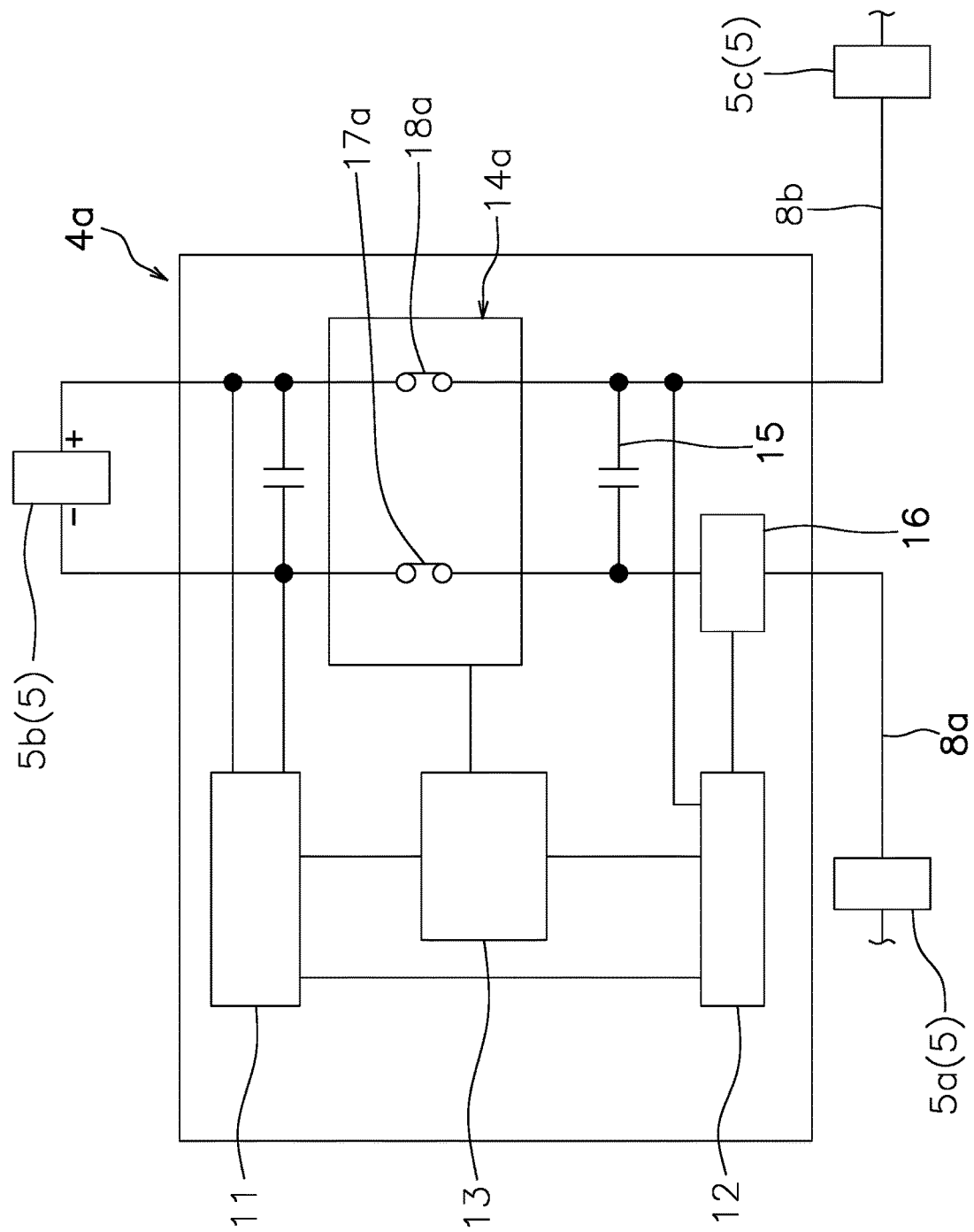
FIG. 5 is a block diagram schematically showing a configuration of a shut-off device.

The start mode is a mode when sunlight starts to hit the solar cell module 5. At this time, each of the solar cell modules 5 receives sunlight to generate electrical power. Then, the shut-off device 4a is driven by the drive power source generated by the regulator 11 from the electrical power generated by the solar cell module 5b. When the shut-off device 4a is driven and the relay control unit 13 receives the control signal from the control unit 3c of the inverter 3 via the signal receiving unit 12, the relay control unit 13 performs control so as to close the first opening/closing unit 17a and the second opening/closing unit 18a of the first relay 14a as shown in FIG. 5.

Similarly, the shut-off device 4b is driven by the electrical power generated by the solar cell module 5e, and closes the first opening/closing unit 17b and the second opening/closing unit 18b of the relay 14b in response to the control signal from the control unit 3c of the inverter 3. Similarly, the shut-off device 4c is driven by the electrical power generated by the solar cell module 5h, and closes the first opening/closing unit 17c and the second opening/closing unit 18c of the relay 14c in response to the control signal from the control unit 3c of the inverter 3. Similarly, the shut-off device 4d is driven by the electrical power generated by the solar cell module 5k, and closes the first opening/closing unit 17d and the second opening/closing unit 18d of the relay 14d in response to the control signal from the control unit 3c of the inverter 3. As a result, the groups 5A to 5D are connected via the shut-off devices 4a to 4d, and the electrical power generated by each solar cell module 5 including the solar cell modules 5a to 5k is output to the inverter 3.

The active mode is a state in which each of the solar cell modules 5 receives sunlight during the day to generate electricity, which is substantially the same as the start mode. Therefore, in the active mode, the groups 5A to 5D are in a connected state via the shut-off devices 4a to 4d, and the electrical power generated by each of the solar cell modules 5 is output to the inverter 3.

The normal shut-off mode is a mode when the solar cell modules 5 are not receiving sunlight during nighttime or due to the influence of the weather such as rain. Therefore, in the normal shut-off mode, electrical power is not generated by the solar cell modules 5, and drive power source is not supplied from the solar cell module 5b to the shut-off device 4a. Similarly, drive power source is not supplied to the shut-off device 4b, the shut-off device 4c, and the shut-off device 4d. Therefore, in the normal shut-off mode, the contacts of the first opening/closing units 17a to 17d and the second opening/closing units 18a to 18d of the shut-off devices 4a to 4d are in the open state. In the present embodiment, electrical power is supplied to the inverter 3 from the AC power supply, and the control signal is always output from the control unit 3c of the inverter 3 except in the emergency safety shut-off mode.

In the normal shut-off mode, for example, when the power generation of the solar cell modules 5b, 5e, 5h, 5k is unstable due to unstable weather or the like, the relays 14a to 14d operate on/off according to the electrical power supplied by the solar cell modules 5b, 5e, 5h, 5k.

The emergency safety shut-off mode is a mode in which the electrical paths 8a to 8h are shut off during the start mode or the active mode to stop the output of electrical power from the solar cell module 5 to the inverter 3. In the present embodiment, as shown in FIG. 1, an operation switch 35 is connected to the inverter 3, and when the operation switch 35 is operated while the shut-off devices 4a to 4d are in the start mode or the active mode, the shut-off devices 4a to 4d switch the operation mode to the emergency safety shut-off mode.

Specifically, when the operation switch 35 is operated, the control unit 3c stops the output of the control signal. When the signal detecting unit 16 detects that the control signal has been stopped for a certain period, all the contacts of the first opening/closing units 17a to 17d and the second opening/closing of the relays 14a to 14d are opened via the signal receiving unit 12 and the relay control unit 13. As a result, the voltage output from all the solar cell modules 5 is shut off.

In the solar power generation system 1 having the above configuration, when the operation mode of the shut-off devices 4a to 4d is the emergency safety shut-off mode, the shut-off devices 4a to 4d can shut off the plurality of solar cell modules 5. For example, the shut-off device 4a can shut off the connection between the group 5A and the group 5B, and further, the connection between the solar cell module 5a belonging to the group 5A and the solar cell module 5b. As a result, the installation cost of the shut-off device can be reduced as compared with the case where the shut-off device is installed for each of the solar cell modules 5. Further, it is possible to provide a solar power generation system having higher safety than the case where the solar cell modules 5 and the inverter 3 are shut off in the string 2 unit.

Here, in the emergency safety shut-off mode, the open circuit voltage of the string 2 is preferably divided into 165 V or less. When the open circuit voltage of the solar cell module 5 is 50 V, the open circuit voltage of the string 2 is 800 V because the string 2 is composed of 16 solar cell modules 5. The open circuit voltage for each group 5A to 5D is 200V. By configuring the shut-off devices 4a to 4d as described above, in the emergency safety shut-off mode, the open circuit voltage for each group 5A to 5D is divided into 150V and 50V, and the connections between the groups 5A to 5D are also shut off. That is, in a state where the contacts of the first opening/closing units 17a to 17d and the second opening/closing units 18a to 18d of the shut-off devices 4a to 4d are all open, the plurality of solar cell modules 5 composing the string 2 are divided into three solar cells modules 5 and one solar cell module 5. Accordingly, if the solar cell modules 5 continue to generate power in the emergency safety shut-off mode, the open circuit voltage becomes 150 V at the maximum, and the safer is higher than when the connection with the inverter 3 is shut off in the string 2 unit.

Further, in the solar power generation system 1, it is possible to secure communication between the drive power supply of the shut-off devices 4a to 4d and the inverter 3 by using the power line 6. As a result, for example, when the shut-off devices 4a to 4d are installed in an existing solar power generation system, additional wiring for connecting the inverter 3 and the shut-off devices 4a to 4d is not required. Therefore, it is possible to reduce the installation cost when installing the shut-off devices 4a to 4d in an existing solar power generation system.

Further, since the shut-off devices 4a to 4d may be connected to one solar cell module 5, the wiring is shorter and simpler than the case where the shut-off devices 4a to 4d are connected across a plurality of solar cell modules 5. As a result, for example, it is possible to reduce the installation cost when installing the shut-off devices 4a to 4d in an existing solar power generation system, and to perform the construction with high flexibility.

Further, since the bypass diode is omitted in the shut-off devices 4a to 4d, the manufacturing cost of the shut-off devices 4a to 4d can be reduced.

Further, the bypass circuit 15 in the shut-off devices 4a to 4d enables the operation mode of the shut-off devices 4a to 4d to be switched from the emergency safety shut-off mode to the start mode according to the control signal of the control unit 3c.

Although one embodiment of the present invention has been described above, the present invention is not limited to the above embodiment, with various modifications being possible without departing from the gist of the invention.

In the above embodiment, each of the groups 5A to 5D includes four solar cell modules 5, but the number of the solar cell modules 5 is not limited to the above embodiment. Further, each of the groups 5A to 5D does not necessarily include the same number of solar cell modules 5. For example, group 5A may include three solar cell modules 5 and group 5B may include five solar cell modules 5.

In the embodiment, the string 2 includes four groups 5A-5D, but the number of groups is not limited to the embodiment. For example, string 2 may include three groups or four or more groups. Further, the arrangement and the number of the shut-off devices 4a to 4d are not limited to the above-described embodiment. For example, in the above embodiment, the shut-off device 4d and the solar cell module 5f may be omitted.

Figure 6:
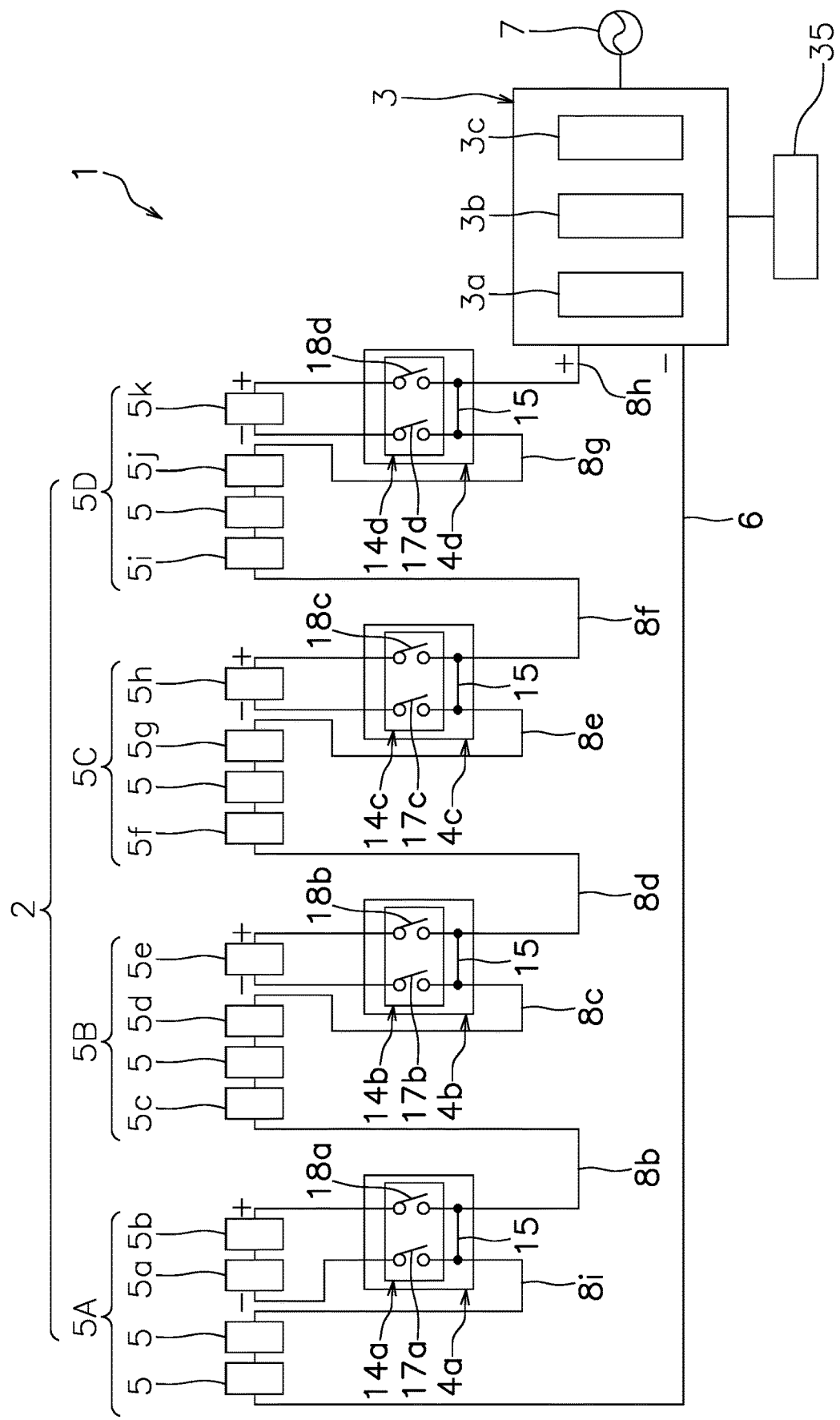
FIG. 6 is a block diagram schematically showing a configuration of a solar power generation system according to another embodiment.

In the above embodiment, the first opening/closing unit 17a opens/closes the connection between the solar cell module 5a and the solar cell module 5b, but as shown FIG. 6, for example, the first opening/closing unit 17a may open/close the connection the solar cell module 5a and the solar cell module 5 connected to a terminal on a cathode side of the solar cell module 5a. In this case, in group A, the open circuit voltage is divided into 100V. The shut-off devices 4b to 4c may also be disposed so that the open circuit voltage is divided into 100V in the groups 5B to 5D.

In the above-described embodiment, switching to the emergency safety shut-off mode is performed by operating the operation switch 35, but switching from the start mode or the active mode to the emergency safety shut-off mode is not limited to the above-described embodiment. For example, the solar power generation system 1 may be provided with a sensor that detects the output state of the solar cell modules 5a. The control unit 3c of the inverter 3 may stop the output of the control signal when an abnormality is detected from the output state of the solar cell modules 5 detected by the sensor, and shut-off devices 4a to 4d may switch the operation mode to the emergency safety shut-off mode. Alternatively, when a fire alarm communicator or a fire alarm is connected to the inverter 3, the inverter 3 may stop the output of the control signal when the inverter receives a signal from the fire alarm communicator or fire alarm, and the shut-off devices 4a to 4d may switch the operation mode to the emergency safety shut-off mode.

In the above embodiment, the relay 14a of the shut-off device 4a includes two contacts of the first opening/closing unit 17a and the second opening/closing unit 18a, but the relay 14a may comprise of two relays each including a single contact.

REFERENCE NUMERALS

1 Solar power generation system
2 String
3 Inverter
4a-4d Shut-off device
5A-5D Solar cell module group
5 Solar cell module
8a-8h Electrical path
12 Signal receiving unit
15 Bypass circuit 17a-17d first opening/closing unit
18a-18d second opening/closing unit

The invention claimed is:

1. A solar power generation system, comprising:
a string including a plurality of solar cell modules connected in series;
an inverter connected to the string, the inverter being configured to convert DC power output from the plurality of solar cell modules to AC power; and
a first shut-off device connected to electrical paths connecting the plurality of solar cell modules to each other,
wherein the string includes a plurality of solar cell module groups each including the plurality of the solar cell modules,
the plurality of solar cell module groups include at least a first group and a second group connected to the first group,
the electrical paths include a first electrical path connecting the first group and the second group, and a second electrical path connecting the plurality of solar cell modules belonging to the first group to each other,
the first shut-off device is configured to shut off the first electrical path and the second electrical path in response to a control signal from the inverter,
the first group includes at least a first solar cell module and a second solar cell module among the plurality of the solar cell modules, the first solar cell module being connected the second group, the second solar cell module being connected the first solar cell module,
the second group includes a third solar cell module connected to the first solar cell module among the plurality of solar cell modules,
the first shut-off device includes a first opening/closing unit configured to open/close a connection between the first solar cell module and the third solar cell module, and a second opening/closing unit configured to open/close a connection between the first solar cell module and the second solar cell module, and
the first shut-off device is driven by an electrical power generated by the first solar cell module.

2. The solar power generation system according to claim 1,
wherein the first opening/closing unit of the first shut-off device is connected to one of a terminal on an anode side or a terminal on a cathode side of the first solar cell module, and
the second opening/closing unit of the first shut-off device is connected to another of the terminal on the anode side or the terminal on the cathode side of the first solar cell module.

3. The solar power generation system according to claim 1, wherein the first shut-off device is externally attached to the first solar cell module.

4. The solar power generation system according to claim 1, further comprising a second shut-off device connected to the electrical paths connecting the plurality of solar cell modules to each other,
wherein the plurality of solar cell module groups further include a third group connected to the second group,
the electrical paths further include a third electrical path connecting the second group and the third group, and a fourth electrical path connecting the plurality of solar cell modules belonging to the second group to each other, and
the second shut-off device is configured to shut off the third electrical path and the fourth electrical path in response to the control signal from the inverter.

5. The solar power generation system according to claim 4,
wherein the second group includes a fourth solar cell module connected to the third group among the plurality of solar cell modules, and
the second shut-off device includes a third opening/closing unit connected to one of a terminal on an anode side or a terminal on a cathode side of the fourth solar cell module, and a fourth opening/closing unit connected to another of the terminal on the anode side or the terminal on the cathode side of the fourth solar cell module.

6. The solar power generation system according to claim 4, wherein the inverter is further configured to output the control signal to the first shut-off device and the second shut-off device by power line communication.

7. The solar power generation system according to claim 4,
wherein the first shut-off device and second shut-off device each include a signal receiving unit configured to receive the control signal from the inverter, and a bypass circuit configured to cause the signal receiving unit to receive the control signal from the inverter in a state where the electrical paths connected to the first shut-off device and the electrical paths connected to the second shut-off device are shut off.

8. A solar power generation system, comprising:
a string including a plurality of solar cell modules connected in series;
an inverter connected to the string, the inverter being configured to convert DC power output from the plurality of solar cell modules to AC power;
a first shut-off device connected to electrical paths connecting the plurality of solar cell modules to each other; and
a second shut-off device connected to the electrical paths connecting the plurality of solar cell modules to each other,
wherein the string includes a plurality of solar cell module groups each including the plurality of the solar cell modules,
the plurality of solar cell module groups include at least a first group and a second group connected to the first group,
the electrical paths include a first electrical path connecting the first group and the second group, and a second electrical path connecting the plurality of solar cell modules belonging to the first group to each other,
the first shut-off device is configured to shut off the first electrical path and the second electrical path in response to a control signal from the inverter,
the plurality of solar cell module groups further include a third group connected to the second group,
the electrical paths further include a third electrical path connecting the second group and the third group, and a fourth electrical path connecting the plurality of solar cell modules belonging to the second group to each other,
the second shut-off device is configured to shut off the third electrical path and the fourth electrical path in response to the control signal from the inverter, and
the first shut-off device and second shut-off device each include a signal receiving unit configured to receive the control signal from the inverter, and a bypass circuit configured to cause the signal receiving unit to receive the control signal from the inverter in a state where the electrical paths connected to the first shut-off device and the electrical paths connected to the second shut-off device are shut off.

9. The solar power generation system according to claim 8,
- wherein the first group includes at least a first solar cell module and a second solar cell module among the plurality of the solar cell modules, the first solar cell module being connected the second group, the second solar cell module being connected the first solar cell module,
- the second group includes a third solar cell module connected to the first solar cell module among the plurality of solar cell modules, and
- the first shut-off device includes a first opening/closing unit configured to open/close a connection between the first solar cell module and the third solar cell module, and a second opening/closing unit configured to open/close a connection between the first solar cell module and the second solar cell module.

10. The solar power generation system according to claim 9,
- wherein the first opening/closing unit of the first shut-off device is connected to one of a terminal on an anode side or a terminal on a cathode side of the first solar cell module, and
- the second opening/closing unit of the first shut-off device is connected to another of the terminal on the anode side or the terminal on the cathode side of the first solar cell module.

11. The solar power generation system according to claim 9,
- wherein the first shut-off device is driven by an electrical power generated by the first solar cell module.

12. The solar power generation system according to claim 9,
- wherein the first shut-off device is externally attached to the first solar cell module.

13. The solar power generation system according to claim 8,
- wherein the second group includes a fourth solar cell module connected to the third group among the plurality of solar cell modules, and
- the second shut-off device includes a third opening/closing unit connected to one of a terminal on an anode side or a terminal on a cathode side of the fourth solar cell module, and a fourth opening/closing unit connected to another of the terminal on the anode side or the terminal on the cathode side of the fourth solar cell module.

14. The solar power generation system according to claim 8, wherein the inverter is further configured to output the control signal to the first shut-off device and the second shut-off device by power line communication.

* * * * *